United States Patent Office 3,114,741
Patented Dec. 17, 1963

3,114,741
CO-POLYMERS OF PERFLUORONITROSOMETH-
ANE AND HEXAFLUOROPROPYLENE AND
PROCESS OF PREPARING SAME
Robert Neville Haszeldine, Manchester, England, and
Christopher John Willis, Vancouver, British Columbia,
Canada, assignors to National Research Development
Corporation, London, England, a corporation of Great
Britain
No Drawing. Filed Sept. 14, 1959, Ser. No. 839,973
Claims priority, application Great Britain Sept. 22, 1958
4 Claims. (Cl. 260—92.1)

This invention relates to polymers of organic compounds which contain fluorine and nitrogen.

It is known that perfluoro-ethylene reacts with perfluoronitroso alkanes to form polymers containing a —C—C—N—O— repeating unit and having a molecular weight greater than 7,000. The reaction takes place rapidly and quantitatively in the dark at temperatures from 0–20° C. and pressures of 10 mms. to 5 atmospheres, the resultant polymer being a colourless viscous oil insoluble in the common organic solvents.

We have attempted to carry out a similar reaction using hexafluoropropylene and perfluoronitroso-alkanes, but we have found that under the reaction conditions suitable for perfluoroethylene, no reaction whatsoever takes place. We then tried carrying out the reaction under various different reaction conditions, and we have now discovered that only under unusual and selective conditions of pressure and temperature does a reaction occur between hexafluoro-propylene and perfluoro-nitroso alkanes to yield a polymeric material.

Accordingly there are provided by the invention polymeric compounds containing a repeating unit of structure

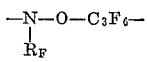

in which $R_F$ represents a perfluorinated alkyl group.

There is further provided by the invention a method of manufacturing the said polymers comprising reacting hexafluoropropylene with a perfluorinated nitroso alkane at a pressure of at least 30 atmospheres and a temperature of at least 50° C. At pressures of from about 30 to 60 atmospheres, temperatures of the order of at least 100° C. are necessary, whilst at higher pressures temperatures of about 50° C. will suffice. The reaction conditions are preferably such that the pressure is between about 30 and 100 atmospheres whilst the temperature is of the order of 100° C. The relative proportions of the two reactants used is not critical, but it is preferred to use approximately equimolar quantities as better results are obtained and polymers of longer chain length are yielded.

Thus, on reacting together hexafluoro-propylene and trifluoronitrosomethane, the following reaction occurs:

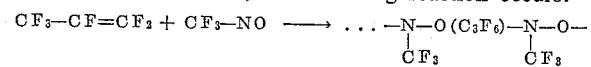

The copolymer

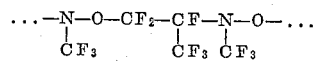

predominates.

It will be understood that the copolymers of the invention are always 1:1, irrespective of the relative properties of reactants used. They range from a colourless transparent oil through a wax to a translucent elastomeric gel. They are insoluble in water and common organic solvents and are stable in vacuo up to at least 200° C. They are of use as coolants, heat transfer media, plasticizers for polymers such as Viton A, surface coatings with good temperature and/or chemical resistance, rubber coatings for sealing chemical plant and for coating chemical equipment subject to corrosive action, particularly by strong acid, for fabrication (as rubber) into O rings, flexible hosing for transportation of corrosive chemicals, lubricants for use with equipment where chemical corrosion is particularly prevalent etc, etc.

The following example further illustrates the invention:

*Example 1*

Trifluoronitrosomethane (and its homologues) may be obtained by application of the method described by D.A. Barr and R.N. Haszeldine in a paper entitled "Perfluoroalkyl Derivatives of Nitrogen (J. Chem. Soc., June 1955, pp. 1881–1889).

When trifluoronitrosomethane and hexafluoropropylene were heated in equimolar proportions at 30° in a stainless steel autoclave at an initial pressure of 10 atmospheres for 8 days, no reaction was detected and the reactants were recovered substantially unchanged.

Equimolar proportions of hexafluoropropylene and trifluoronitrosomethane were then reacted in a steel autoclave at an initial pressure of 30 atmospheres and a temperature of 100° C. for 14 days. At the end of this time a 34% yield of a colourless viscous oil was obtained which analysis showed to be a 1:1 copolymer. Found: C, 19.2; H, 0.1; N, 5.6. ($C_4F_9NO$) requires: C, 19.3; H, nil; N, 5.6.

We claim:
1. A co-polymer of equimolecular quantities of perfluoronitrosomethane and hexafluoropropylene essentially consisting of repeating units of the structure:

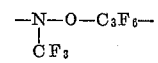

the repeating unit predominantly being

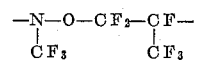

and said copolymer at least being of a degree of advancement sufficient to be of oily liquid consistency.

2. A method of manufacture of the co-polymer of claim 1 comprising treating hexafluoropropylene with a perfluoronitrosomethane at a pressure of at least 30 atmospheres and a temperature of at least 50° C.

3. A method according to claim 2 in which substantially equimolar proportions of hexafluoropropylene and perfluoronitrosomethane are reacted together.

4. A method as claimed in claim 2 in which the reaction is carried out at pressures of between 30–60 atmospheres and a temperature of the order of 100° C.

References Cited in the file of this patent

Barr et al.: Nature, 175, 991–2 (1955).
Barr et al.: Journal of The Chemical Society, 1881–1889 (1955).